(12) United States Patent
Lattin

(10) Patent No.: US 9,353,865 B2
(45) Date of Patent: May 31, 2016

(54) MECHANICAL FACE SEAL

(71) Applicant: Thermo King Corporation, Minneapolis, MN (US)

(72) Inventor: Robert Michael Lattin, Minneapolis, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 0 days.

(21) Appl. No.: 14/294,461

(22) Filed: Jun. 3, 2014

(65) Prior Publication Data

US 2015/0345641 A1 Dec. 3, 2015

(51) Int. Cl.
*F16J 15/34* (2006.01)
*F16N 21/00* (2006.01)

(52) U.S. Cl.
CPC .............. *F16J 15/342* (2013.01); *F16N 21/00* (2013.01)

(58) Field of Classification Search
CPC ... F16J 15/3412; F16J 15/342; F16J 15/3424; F16J 15/3428
USPC ......................................................... 277/401
See application file for complete search history.

(56) References Cited

U.S. PATENT DOCUMENTS

| | | | | |
|---|---|---|---|---|
| 3,695,789 A | * | 10/1972 | Jansson | 418/75 |
| 3,744,805 A | * | 7/1973 | Heinrich | 277/400 |
| 5,066,026 A | * | 11/1991 | Heck et al. | 277/400 |
| 5,201,531 A | | 4/1993 | Lai | |
| 5,217,233 A | | 6/1993 | Pecht et al. | |
| 5,385,409 A | * | 1/1995 | Ide | 277/400 |
| 5,498,007 A | | 3/1996 | Kulkarni et al. | |
| 5,501,470 A | * | 3/1996 | Fuse et al. | 277/400 |
| 5,529,317 A | * | 6/1996 | Muller | 277/400 |
| 5,529,318 A | | 6/1996 | Fuse et al. | |
| 5,556,111 A | * | 9/1996 | Sedy | 277/400 |
| 5,605,339 A | | 2/1997 | Pecht et al. | |
| 5,664,787 A | | 9/1997 | Fuse et al. | |
| 5,722,665 A | * | 3/1998 | Sedy et al. | 277/400 |
| 6,189,896 B1 | | 2/2001 | Dickey et al. | |
| 6,446,976 B1 | * | 9/2002 | Key et al. | 277/367 |
| 6,454,268 B1 | | 9/2002 | Muraki | |

(Continued)

FOREIGN PATENT DOCUMENTS

| | | |
|---|---|---|
| CN | 203051777 | 7/2013 |
| JP | 08-296745 | 11/1996 |

OTHER PUBLICATIONS

International Search Report and Written Opinion for International Application PCT/US2015/033727, Dated Aug. 27, 2015, 10 pgs.

*Primary Examiner* — Kristina Fulton
*Assistant Examiner* — Eugene G Byrd
(74) *Attorney, Agent, or Firm* — Hamre, Schumann, Mueller & Larson, P.C.

(57) ABSTRACT

A mechanical face seal and a method of using the mechanical face seal are described. The mechanical face seal includes a plurality of groove sets that are etched into a stationary seal and/or a rotating seal ring. Each of the plurality of groove sets includes feed grooves, collection grooves, distribution grooves, a collector, retention cavities and discharge grooves. The mechanical face seal can be used to reduce the friction that is generated from the stationary seal and the rotating seal ring during operation. Additionally, the groove sets work cooperatively to introduce, circulate and expel lubricant between the seal interface, thereby promoting cooling of the seal.

22 Claims, 9 Drawing Sheets

(56) References Cited

U.S. PATENT DOCUMENTS

| | | | |
|---|---|---|---|
| 6,726,213 B2 * | 4/2004 | Wang | 277/400 |
| 7,044,470 B2 * | 5/2006 | Zheng | 277/400 |
| 7,963,525 B1 * | 6/2011 | Garrison | 277/416 |
| 8,091,898 B2 | 1/2012 | Garrison | |
| 8,360,436 B2 * | 1/2013 | Teshima et al. | 277/400 |
| 2002/0014743 A1 | 2/2002 | Zheng | |
| 2012/0280458 A1 * | 11/2012 | Artiles et al. | 277/411 |

\* cited by examiner

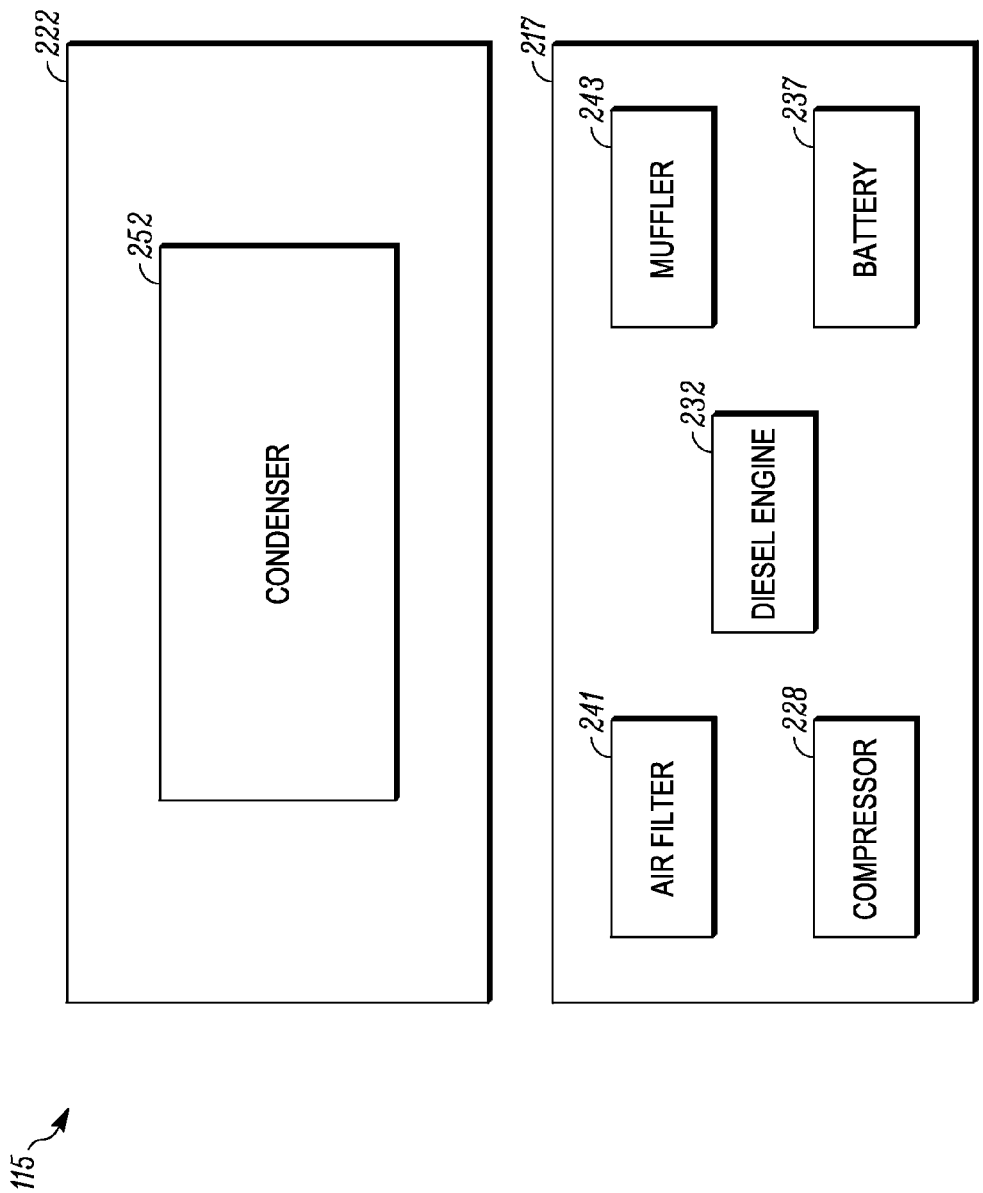

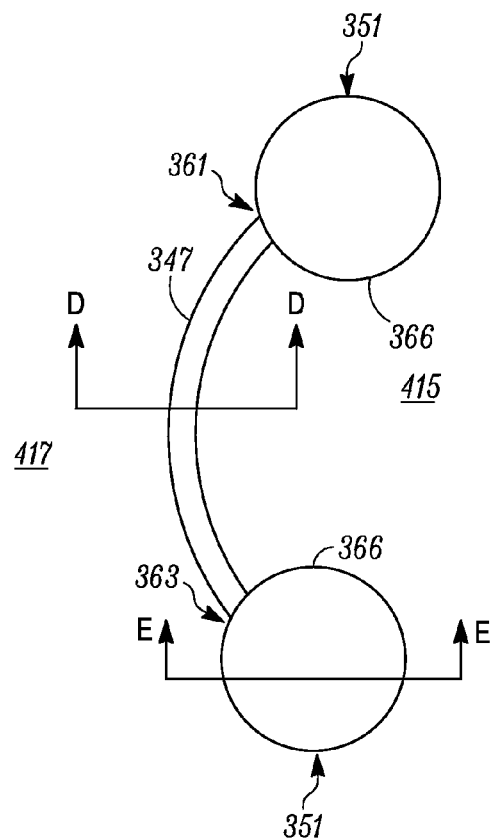
FIG. 7A
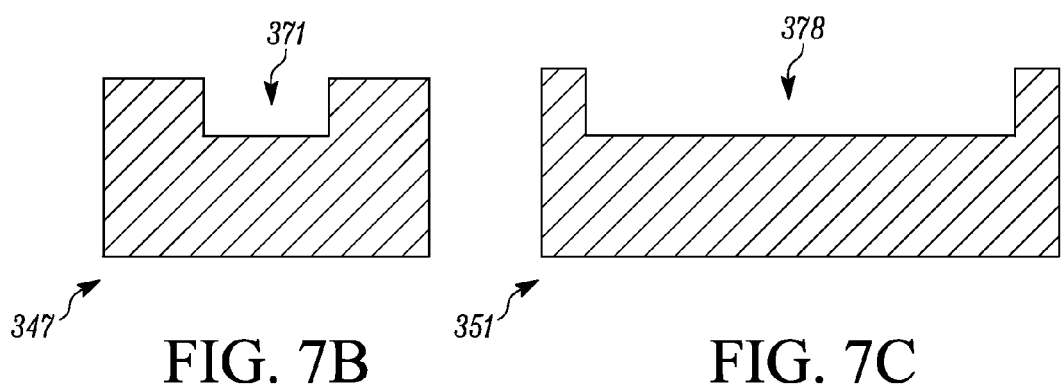
FIG. 7B
FIG. 7C

MECHANICAL FACE SEAL

The embodiments disclosed herein relate generally to mechanical face seals and methods for reducing friction between a rotating seal and a stationary seal of the mechanical face seal.

BACKGROUND

Mechanical face seals typically are used for sealing two components, where one of the components can be a stationary seal and the other component can be a rotating seal. A common failure mode of mechanical face seals in such instances is overheating due to high friction between the rotating seal and the stationary seal. Friction between the rotating seal and the stationary seal is generally governed by factors such as the static load and the material pair. Improvements in design of mechanical seals that lessen the dependence on such factors to avoid overheating are desirable.

SUMMARY

The embodiments described herein are directed to a mechanical face seal and methods for reducing friction between two seals by using the mechanical face seal.

Generally, the mechanical face seal includes groove sets that are configured to receive lubricant from an inside of the seal, direct the lubricant through the groove sets so as to counteract a pressure loading on the seal, and discharge the lubricant to an outside of the seal. The use of the mechanical face seal can lead to reduction in friction and heat being carried away from the seal interface. Moreover, the mechanical face seal described herein can redirect lubricant from its normal flow tendency and thereby reduce lubricant leakage from the mechanical face seal.

Note that the term "outside of the seal" refers to the ambient environment, while the term "inside the seal" refers to (1) the higher pressure side of the seal as compared to the "outside of the seal", and/or (2) the side of the lubricant source. Note that in some examples, the side of the lubricant source could have a pressure that is lower than the "outside of the seal", e.g., a pressure that is lower than ambient pressure. Note also that the "inside of the seal" can be an external side relative to an outer surface of the seal or an internal side relative to the outer surface of the seal, depending on which of the external side or the internal side is exposed to the pressure of the refrigerant gas and compressor lubricant. Similarly, the "inside of the seal" can be the external side or the internal side depending on which of the external side or the internal side is exposed to the pressure of the refrigerant gas and compressor lubricant.

In some embodiments, the mechanical face seal provides a seal between two components that are rotatable relative to one another. One of the components can be a stationary seal while the other component can be a rotating seal. The mechanical face seal can include a surface that is modified to form a plurality of groove sets. In one example, the plurality of groove sets can be etched in the stationary seal and/or the rotating seal. Each of the plurality of groove sets can include feed grooves, collection grooves, distribution grooves, a collector, retention cavities and discharge grooves.

In some examples, a cooperative effect of the groove sets is utilized to direct a lubricant to the interface between the rotating and the stationary seals without forming a leakage passage across the seal interface. In some examples, a cooling effect by the lubricant directed at the seal interface is achieved by the groove sets acting cooperatively to remove the lubricant from the interface between the rotating and the stationary seals and promoting circulation of the lubricant.

In one implementation, the grooves sets, namely, the feed grooves, the collection grooves, the distribution grooves, the collector, the retention cavities and the discharge grooves are in fluid communication with one another. In some examples, the grooves sets are in fluid communication with one another in the instances where the seal is rotating and hydrodynamic forces separate the rotary seal from the stationary seal. In this instance, the flow passages can be in limited fluid communication across the non-etched portion of the seal surface. In some examples, when the seal comes to rest, a preload on the seal can cause the seal surfaces to squeeze out the lubricant between the seal surfaces and come into contact with one another. In some examples, at this point, the flow passages may not be in fluid communication with one another, and as such, leakage across the seal can be suppressed by the interruption in the flow passages.

In some examples, the feed grooves can include a plurality of flow passages that extend from a first end to a second end. In one implementation, the feed grooves can be configured so that fresh lubricant can be introduced from the inside side of the seal through the first end of the feed grooves and directed toward the second end of the feed grooves.

In some examples, the collection grooves can include a plurality of flow passages that extend from a third end to a fourth end. In one implementation, the collection grooves can be configured so that the lubricant from the second end of the feed grooves can be collected at the third end of the collection grooves.

Note that in some instances, when there is relative motion between the rotating and stationary seals, hydrodynamic forces can separate the seal surfaces and lubricant can be supplied to the seal surfaces via the feed grooves. Lubricant can be captured by the flow passage starting at the third end of the flow passages. In some instances, when the seal surfaces separate, the lubricant can be forced from inside the seal. In some instances, the collection grooves are shaped to act in concert with the rotary motion and use hydrodynamic force generated between the seal surfaces to redirect lubricant flow toward the source of the lubricant.

In some instances, the collected lubricant can be directed toward the fourth end of the collection grooves, and distribute the lubricant where the lubricant is needed, for example, an interface between the stationary seal and the rotating seal. In some instances, each of the flow passages of the collection grooves can include a main flow passage and a plurality of branched flow passages that branches from the main flow passage and terminates at an outer end. In some implementations, the branched flow passages when viewed in side view has a depth that progressively decreases as the branched flow passage projects toward the outer end until the branched flow passage is terminated.

In some instances, some of the branched flow passages are oriented toward the direction of rotation. In this instance, the outer ends of the branched flow passages act to collect lubricant from the seal interface surface and direct lubricant to the main collection groove flow passage.

In some other instances, some of the branched flow passages are oriented away from the direction of rotation. In this instance, the lubricant may accumulate at the outer ends and form a hydrodynamic pressure gradient at the surface of the seal. The pressure gradient that is formed at the surface of the seal can act against the normal closing force of the seal causing the seal faces to separate. When the seal surfaces separate, lubricant can be provided between the seal surfaces. Advantageously, separation of the seal faces can lower friction. Moreover, the lubrication that is provided by the lubricant lowers friction while circulation of the lubricant can remove heat from the seal interface.

In some examples, the distribution grooves can include a plurality of flow passages that extend from a fifth end to a sixth end. In one implementation, the distribution grooves can be configured so that the lubricant from the fourth end of the collection grooves can be collected at the fifth end of the distribution grooves and directed toward the sixth end of the distribution grooves. In some instances, each of the flow passages of the distribution grooves can include a main flow passage and a plurality of branched flow passages that branches from the main flow passage and terminates at an outer end. In some implementations, the branched flow passages when viewed in side view has a depth that progressively decreases as the branched flow passage projects toward the outer end until the branched flow passage is terminated. In some instances, grooves can be shaped to capture or distribute lubricant toward the seal interface.

In some examples, the collector extends from a seventh end to an eighth end and can be configured to capture the fresh lubricant from the second end of the feed grooves and direct the fresh lubricant toward the third end of the collection grooves. In some examples, the collector helps to capture lubricant on the farthest extent of the mechanical face seal from the point of feed and redirect the lubricant toward the collection grooves where the lubricant can be appropriately distributed on the seal surface.

In some examples, the retention cavities can be configured to capture lubricant from the seal surface and direct the lubricant toward the feed direction rather than lose the lubricant from the seal interface.

In some examples, the discharge grooves can include a plurality of flow passages that extend from a ninth end to a tenth end and positioned adjacent to the feed grooves. In some instances, the pattern of the flow passages of the discharge grooves can be similar to that of the feed grooves so that the groove pattern of the discharge grooves is a mirror image of that of the feed grooves along a center axis that is parallel to the flow passages of the discharge grooves that extend from the ninth end to the tenth end and the flow passages of the feed grooves that extend from the first end to the second end. The discharge grooves can be configured to collect lubricant that has been warmed by the friction between the stationary seal and the rotating seal and direct the warm lubricant toward the ninth end, thereby discharging the warm lubricant, for example, to the external side of the seal.

Other aspects of the invention will become apparent by consideration of the detailed description and accompanying drawings.

BRIEF DESCRIPTION OF THE DRAWINGS

FIG. 2A is a schematic illustration of a cross-sectional side view of a transport refrigeration unit (TRU) included in the reefer of FIG. 1, according to one embodiment.

In FIG. 3B, the source of the lubricant is located on the external side of the seal ring. In FIG. 3C, the source of the lubricant is located on the internal side of the seal ring.

FIG. 7A illustrates a top plan view of a collector and retention cavities, according to one embodiment. FIG. 7B shows a cross-sectional side view of the collector shown in FIG. 7A, according to one embodiment. FIG. 7C shows a cross-sectional side view of one of the retention cavities shown in FIG. 7A, according to one embodiment.

DETAILED DESCRIPTION

The embodiments described herein are directed to a mechanical face seal and methods for reducing friction between a rotating seal and a stationary seal of the mechanical face seal.

Figure 1:
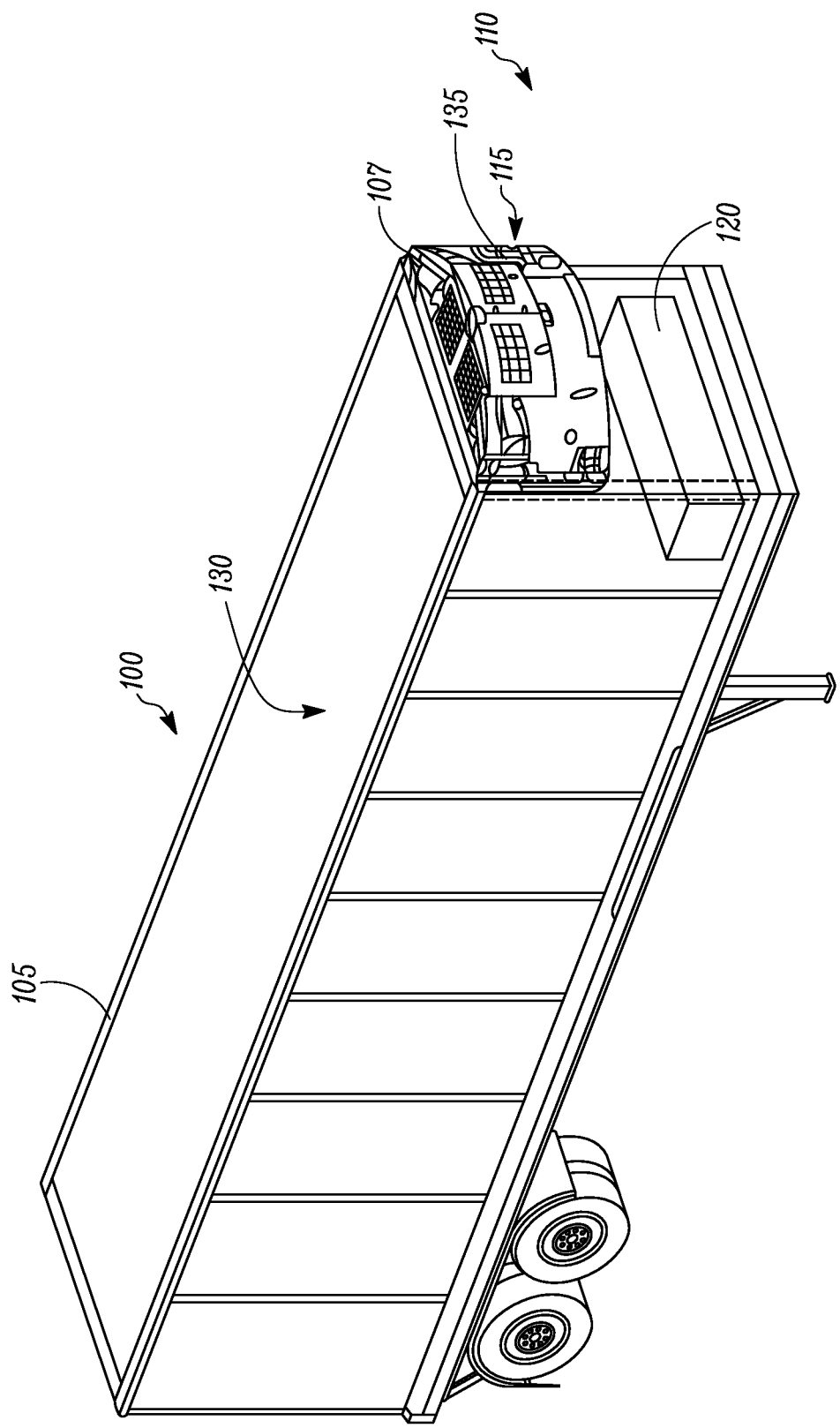
FIG. 1 illustrates a side perspective view of a reefer, according to one embodiment, in which the mechanical face seal described herein can be utilized.

In some embodiments, the mechanical face seal described herein can be used, for example, in a reefer. The term "reefer" generally refers to, for example, a conditioned trailer, container, railcars or other type of transport unit, etc. FIG. 1 illustrates one example of a reefer 100 in which the mechanical face seal described herein can be used. The reefer 100 includes a transport unit 105 and a transport refrigeration system (TRS) 110. The term "transport refrigeration system" or "TRS" refers to a refrigeration system for controlling the refrigeration of an in conditioned space of the reefer. The TRS 110 includes a transport refrigeration unit (TRU) 115 connected to a power source 120. The transport unit 105 can be disposed on a ship, on a train, a truck, etc. The TRU 115 is positioned adjacent to a front side 107 of the transport unit 105 and is enclosed in a housing 135. The TRS 110 is configured to transfer heat between an internal space 130 and the outside environment. In some embodiments, the TRS 110 is a multi-zone system in which different zones or areas of the internal space 130 are controlled to meet different refrigeration requirements based on the cargo stored in the particular zone.

FIG. 2A shows a front schematic view of the TRU 115. The TRU 115 includes a lower compartment 217 and a condenser compartment 222. The lower compartment 217 is generally positioned below the condenser compartment 222.

The lower compartment 217 can contain a compressor 228, a compressor engine 232, a battery 237, an air filter 241 and/or a muffler 243. The condenser compartment 222 can contain a condenser 252. In one example, the mechanical face seal described herein can be used, for instance, as a shaft seal in the compressor 228.

Figure 2B:
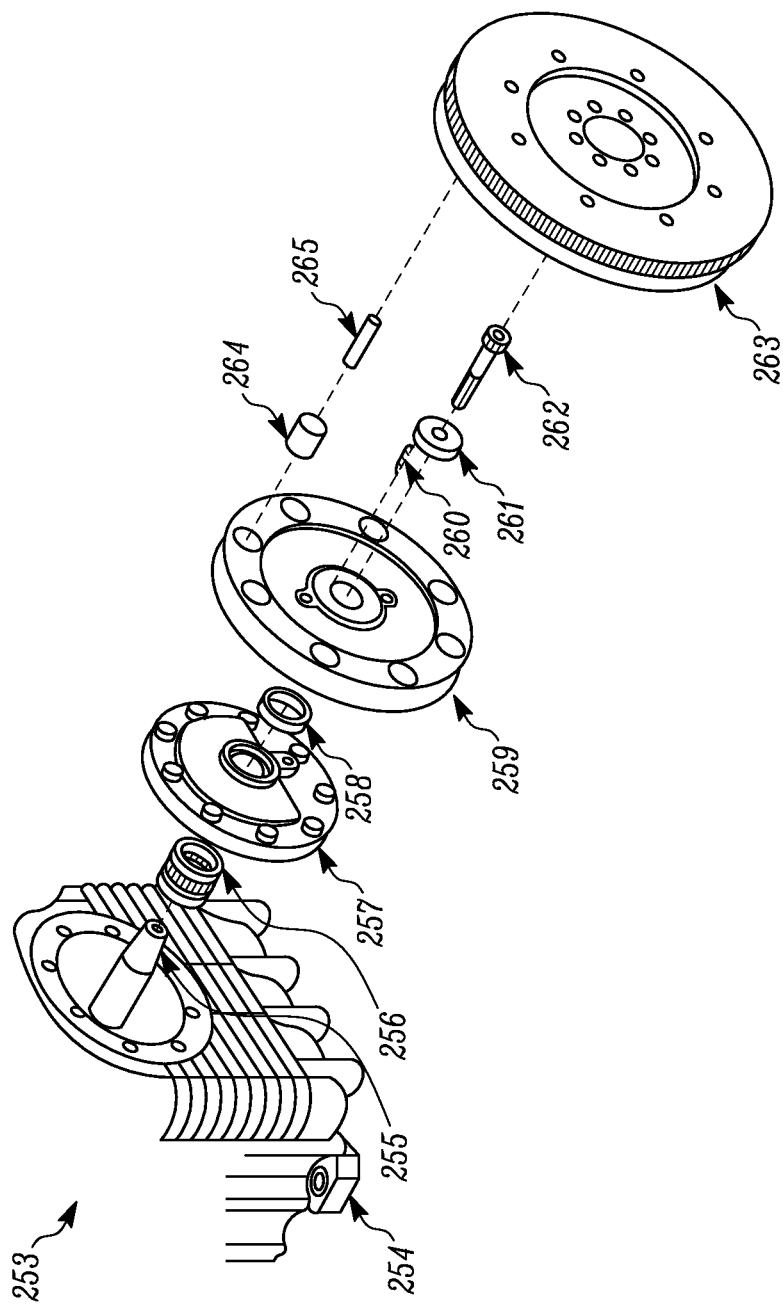
FIG. 2B is a schematic illustration of an assembly included in the TRU shown in FIG. 2A that includes a compressor, a shaft seal and an engine flywheel, according to one embodiment.

FIG. 2B shows an assembly 253 that can be included in the TRU 115. The assembly 253 includes a compressor body 254, a crank shaft 255, a shaft seal assembly 256, a compressor cover plate 257, a dust seal 258, a compressor coupling 259, a bolt 260, a washer 261, another bolt, a bushing 265, a dry pin 265 and a fly wheel 263.

Details of the mechanical face seal will now be described. Generally, the mechanical face seal provides a seal between two components that are rotatable relative to one another. One of the components can be a stationary seal ring while the other component can be a rotating seal ring.

Generally, sealing systems can typically require the surfaces of both the stationary and rotating rings to be very flat e.g. within 2 helium light bands or 560 nm. Advantageously, the mechanical face seal described herein includes a plurality of groove sets that are oriented so as to promote lubrication and cooling of the interface of the rotating and stationary seal rings while simultaneously maintaining pressurization and or lubrication on one side of the mechanical face seal and not allowing leakage of pressurizing gas or lubricant across the boundary defined by the mechanical face seal. In one example, the plurality of groove sets can be etched in the stationary seal ring and/or the rotating seal ring so that the seal ring(s) includes discrete patterns of grooved and ungrooved surfaces.

Figure 3A:
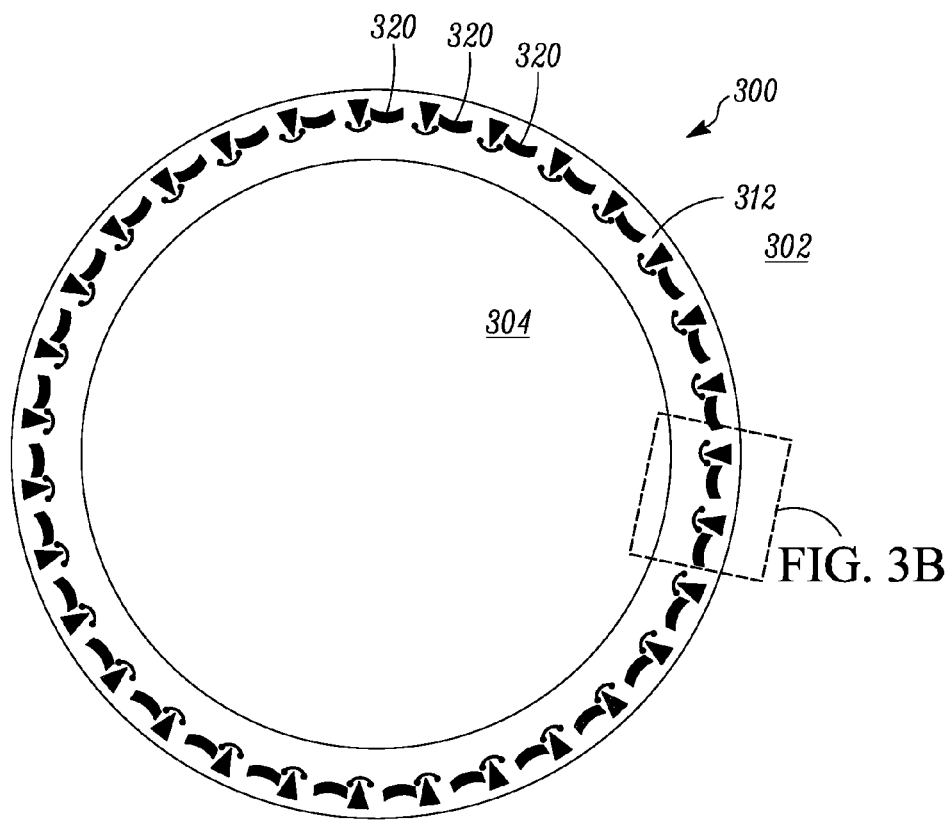
FIG. 3A illustrates a top plan view of a seal ring, according to one embodiment.

FIG. 3A shows an example of one of the seal rings of a mechanical face seal of the present disclosure (see seal ring 300). FIG. 3A shows a top plan view of the seal ring 300. The seal ring 300 has a radially extending seal face 312. The seal ring 300 has an external side 302 and an internal side 304. The seal ring 300 is shaped and dimensioned to oppose a face of an opposing seal face of a second seal ring (not shown). The seal ring 300 may be a stationary ring or a rotating ring. FIG. 3A shows the shape of the seal as a ring, but it is to be realized that the seal can be any shape or dimension that is suitable for providing a seal between a primary seal and a mating seal.

Figures 3B, 3C:
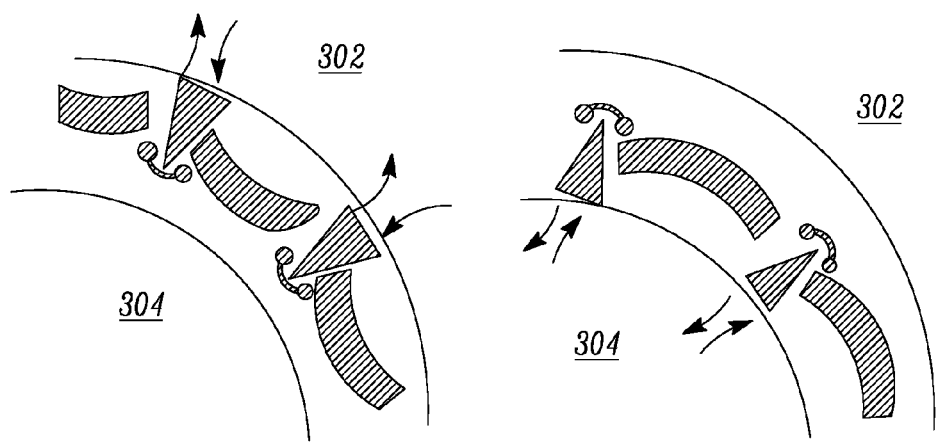
FIG. 3B illustrates an exploded top plan view of a section of the seal ring in FIG. 3A.
FIG. 3C illustrates an alternative configuration of the groove sets according another embodiment.
Figure 4:
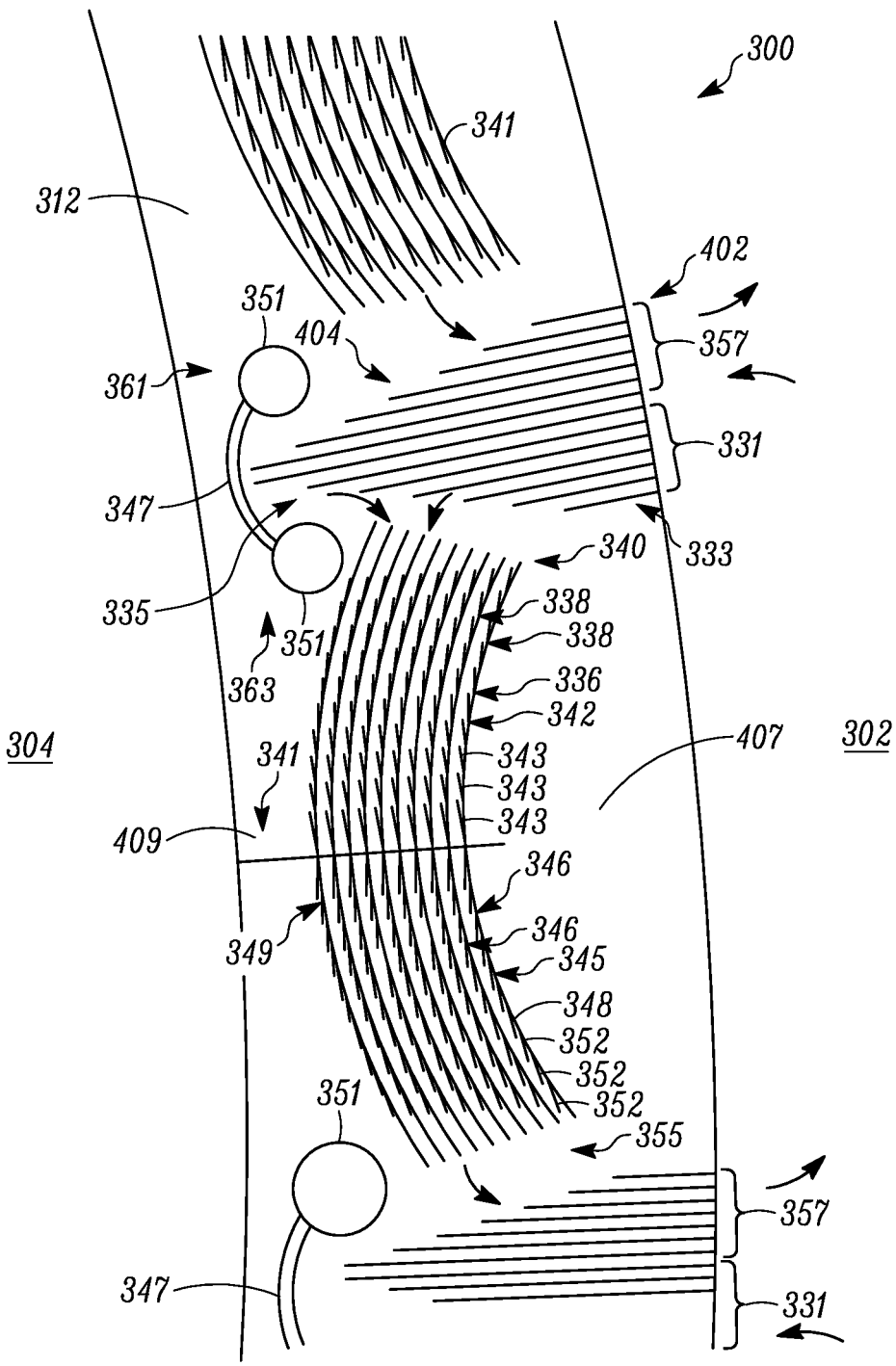
FIG. 4 illustrates an exploded top plan view of a section of the seal ring shown in FIG. 3A, according to one embodiment.

Referring to FIGS. 3A, 3B and 4, the seal ring 300 can include a plurality of groove sets 320. Each of the groove sets 320 can include feed grooves 331, collection grooves 336, distribution grooves 345, a collector 347, retention cavities 351 and discharge grooves 357.

In general, the groove sets 320, namely, the feed grooves 331, the collection grooves 336, the distribution grooves 345, the collector 347, the retention cavities 351 and the discharge grooves 357 are configured so that lubricant can enter through the feed grooves 331, flow through the collection grooves 336 and the distribution grooves 345, and be discharged out through the discharge grooves 357.

In some examples, the groove sets 320 can be in fluid communication with another when there is relative motion between the rotating seal ring and the stationary seal ring. In some examples, hydrodynamic forces separate the rotating seal ring from the stationary seal ring during rotation of the rotating seal ring. In this instance, the groove sets 320 can be in limited fluid communication across the non-etched portion of the seal surface. In some examples, when the seal comes to rest, a preload on the seal 300 can cause the seal surfaces to squeeze out the lubricant between the seal surfaces and come into contact with one another. In some examples, at this point, the flow passages of the groove sets 320 may not be in fluid communication with one another, and as such, leakage across the seal 300 can be suppressed by the flow passages of the groove sets 320.

Any lubricant that flows past the feed grooves 331 can be collected by the collector 347. In some examples, when there is relative motion between the rotating seal and the stationary seal, the collector 347 can be shaped such that it can redirect the lubricant toward the initial source of the lubricant and into the retention cavities 351. The retention cavities 351 can redirect the lubricant back toward the collection grooves 336. The arrows in FIG. 4. show the general flow path of the lubricant.

Generally, fresh lubricant from a supply (not shown) that is provided on the external side 302 of the seal ring 300 enters the seal ring 300 through the feed grooves 331. In some examples, the fresh lubricant is introduced via a pressure source.

In some instances, the pattern of the groove sets 320 can be such that lubricant and gas pressure is located on the "inside" of the seal ring 300 and the atmospheric pressure is at the "outside" of the ring. In this instance, hydrodynamic interactions of lubrication features on the seal face are used to pump lubricant across the face of the seal ring 300 in opposition to the natural tendency of gas pressure to force the lubricant out of the seal interface. This principle is shown, for example, where the distribution grooves 357 direct lubricant back toward the external side 302 in FIG. 4 where the gas pressure is higher than the atmospheric pressure on the "inside" of the ring. The discharge groves 357 also can pump lubricant back toward the source against the gas pressure maintained by the seal ring 300.

Note that the term "outside of the seal ring 300" refers to the side of the ambient environment, while the term "inside of the seal ring 300" refers to (1) the higher pressure side of the seal ring 300 as compared to the "outside of the seal ring 300", and/or (2) the side of the lubricant source. Note that the "inside of the seal ring 300" can be the external side 302 or internal side 304 of the seal ring 300 depending on which of the external side 302 or the internal side 304 is exposed to the pressure of the refrigerant gas and lubricant. In FIGS. 3A and 3B, the "inside" of the seal ring 300 is the external side 302 since in this instance, the external side 302 is exposed to the pressure of the refrigerant gas and compressor lubricant. The "outside" of the seal ring 300 is the internal side 304. Note that in some examples, the "inside of the seal ring 300" can be the side of the lubricant source, and have a pressure that is lower than the "outside of the seal ring 300", e.g., at lower than ambient pressure.

On the other hand, FIG. 3C shows an arrangement where the source of the lubricant is on the internal side 304. That is, the internal side 304 is exposed to the pressure of the refrigerant gas and compressor lubricant. Thus, the "inside" of the seal ring 300 in FIG. 3C is the internal side 304, while the "outside" of the seal ring 300 in FIG. 3C is the external side 302 of the seal ring 300.

The term "fresh lubricant" herein means lubricant that is provided from a supply of lubricant that is inside of the seal. The lubricant that can be utilized can be any lubricant that is suitable for use in a mechanical seal. The lubricant can be, but is not limited to, a mineral oil such as napthenene based oil, paraffin based oil or mixtures thereof, a polyolester oil, alkyl benzene, a polyglycol, a dibasic acid ester, a neo pentyl ester, silicone, silicate ester and a polyvinylether.

In some examples, the fresh lubricant can be cooled before being introduced into the seal ring 300. In one example, the fresh lubricant can be cooled by dilution within an oil sump, where fresh flow of oil can be circulated from the oil sump to the seal ring 300. In some examples, oil could be cooled by running the supply of oil through a heat exchanger prior to entering the seal cavity. In some examples, refrigerant that is mixed in with the oil could be flashed off of the oil before entering the seal ring 300, thereby cooling the oil.

In some examples, the fresh lubricant that has been cooled can be introduced into the seal ring 300 through the feed grooves 331 in a direction generally toward the internal side 304 of the seal ring 300. In some examples, the geometry of the feed grooves 331 is constructed such that relative motion between the stationary seal and rotating seal causes local hydrodynamic pressure at an interface between the feed grooves 331 and the seal surfaces. This local hydrodynamic pressure can act against the static loading of the seal ring 300 and can cause the stationary and rotating seal ring to separate slightly. After the seal surfaces separate, a very thin layer of lubricant can be allowed to wet the surface of the seal interface. As the collection grooves 336 move across the wetted surface, lubricant can be collected and redirected by collaboration of the collection grooves 336 and the distribution grooves 345. This action can generally provide lubrication to the seal interface and lessens frictional drag between the two surfaces where there is relative motion between the two surfaces.

The term "seal interface" herein means the interface between two seals, for example, the stationary seal and the rotating seal.

The lubricant provided at the seal interface generally becomes warm due to the friction between the two seals. The warm lubricant can then be directed to the discharge grooves 357, where the warm lubricant is discharged to the external side 302 of the seal ring 300 back to the supply of the lubricant. The warmed lubricant then can be cooled and introduced back into the seal through the feed grooves 331. Generally, any lubricant that flows past the feed grooves 331 in a radially inward direction or, any lubricant on the inner perimeter of the seal interface can be captured by the collector 347 and redirected into the retention cavities 351. The retention cavities 351 can redirect the lubricant radially outward back toward the initial direction of feed where the lubricant may be captured by the collection grooves 336.

The description below will describe embodiments where the fresh lubricant is supplied from the external side 302 of the seal ring 300. However, in some other embodiments, as discussed above, fresh lubricant can be supplied from the internal side 304 of the mechanical seal ring. In this instance, the seal ring can be provided with groove sets, where each of the groove sets is a mirror image of each of the groove sets 320 as shown in FIG. 3C. In this instance, fresh lubricant would be provided to the corresponding feed grooves from the internal side 304 and warm lubricant would be discharged out through the corresponding discharge grooves toward the internal side 304. The corresponding collector, retention cavities, collection grooves and discharge grooves 357 can have substantially the same shape and functions as described below, except that they can be configured to prevent leakage out to the external side 302 rather than the internal side 304.

Note that the relative motion between the rotating seal ring and the stationary seal ring can be clockwise or counter clockwise. In some examples, the arrangement of the groove sets 320 provide similar effects for when the relative motion between the rotating seal ring and the stationary seal ring is clockwise or counter clockwise.

In some examples, the functional operation of the groove sets 320 can change during use of the seal ring 300 such that, for example, the feed grooves 331 can have the function of the discharge grooves 357. In other examples, the function of the collection grooves 336 can have the function of the distribution grooves 345. In some instances, when the rotating seal ring and stationary seal ring operate in only one direction relative to each other, further optimization of the pattern is possible to ensure friction reduction, lubrication circulation and prevention of leakage.

Details of each of the feed grooves 331, the collection grooves 336, the distribution grooves 345, the collector 347, the retention cavities 351 and the discharge grooves 357 will now be described in turn.

Figure 5A:
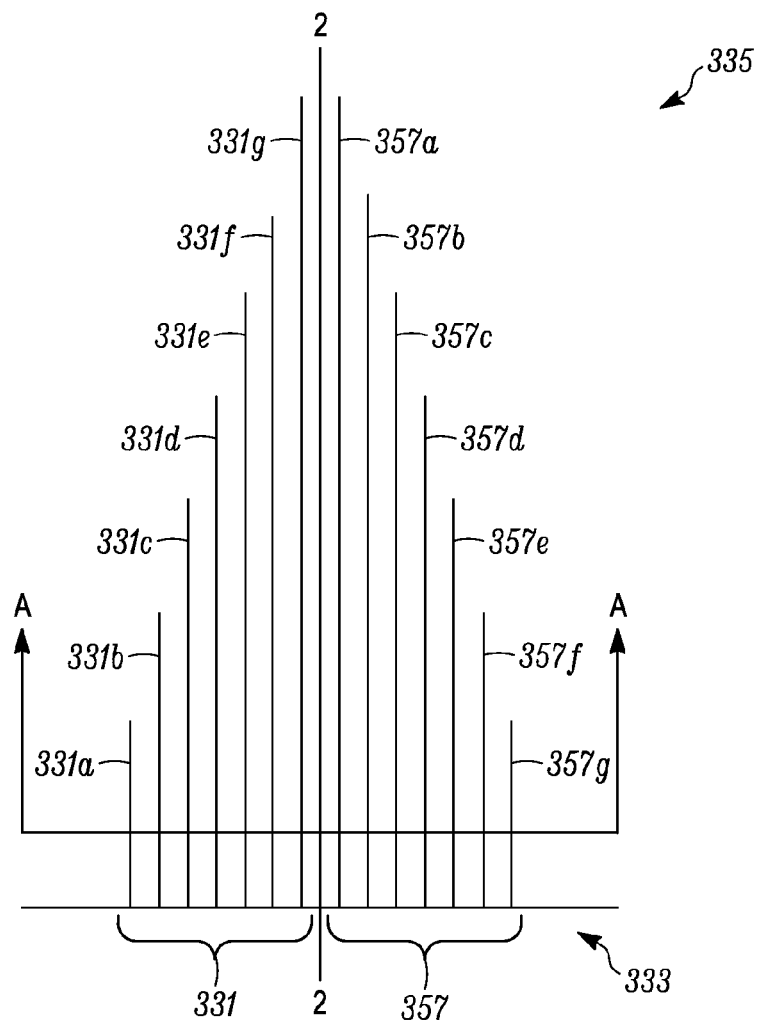
FIG. 5A illustrates an exploded top plan view of feed grooves and discharge grooves, according to one embodiment.
Figure 5B:
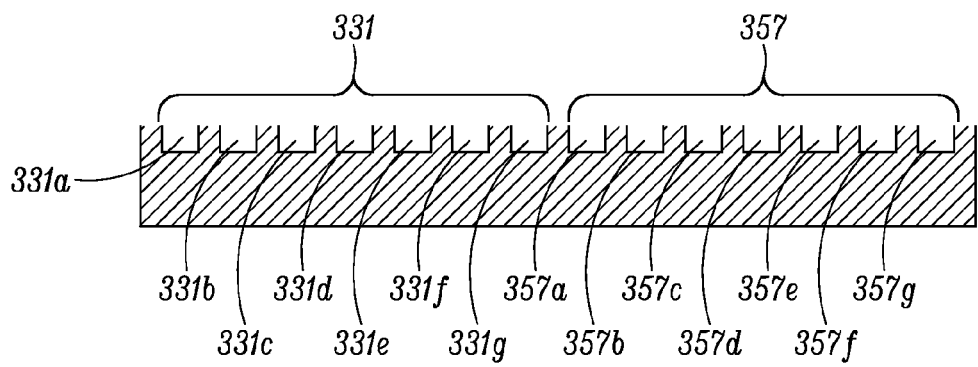
FIG. 5B illustrates a cross-sectional side view of the feed grooves and the discharge grooves in FIG. 5A, according to one embodiment.

Referring to FIGS. 4, 5A and 5B, the feed grooves 331 can include a plurality of flow passages 331$a$, 331$b$, 331$c$, 331$d$, 331$e$, 331$f$ and 331$g$ that extend from a first end 333 to a second end 335 and are generally configured to allow fresh lubricant to enter into the seal ring 300 and flow toward the second end 335. The left hand side of FIG. 5A is a top plan view of the feed grooves 331. The left hand side of FIG. 5B is a cross-sectional side view of the feed grooves 331 taken along A-A. In FIG. 5A, seven flow passages for the feed grooves 331 are shown. However, the number of flow passages can be any number that is suitable for allowing the lubricant to enter the seal ring 300 and flow toward the second end 335. Also, in FIG. 5B, each of the flow passages 331$a$, 331$b$, 331$c$, 331$d$, 331$e$, 331$f$ and 331$g$ is shown to be cup shaped. However, it is to be realized that the shape of each the flow passages 331$a$, 331$b$, 331$c$, 331$d$, 331$e$, 331$f$ and 331$g$ can be any shape that is suitable for allowing the lubricant to enter the seal ring 300 and flow toward the second end 335 and, assymetrical edge treatments may promote the distribution or collection of the lubricant on the mating surface.

Figure 6A:
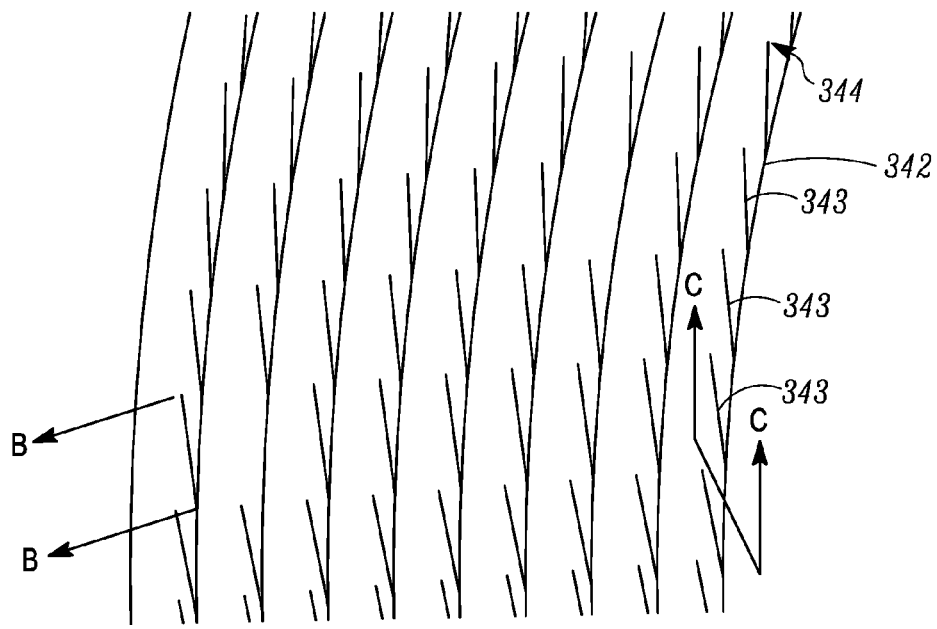
FIG. 6A illustrates an exploded top plan view of the collection grooves, according to one embodiment.
Figure 6B:
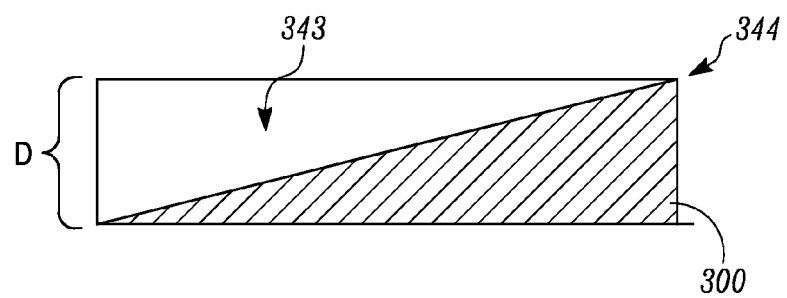
FIG. 6B illustrates a cross-sectional side view of a branched flow passage shown in FIG. 6A, according to one embodiment.
Figure 6C:
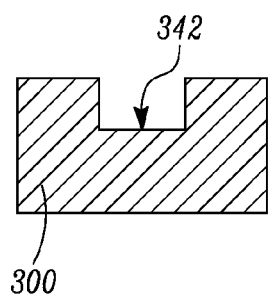
FIG. 6C illustrates a cross-sectional side view of a main passage shown in FIG. 6A, according to one embodiment.

Referring to FIGS. 4, 6A, 6B, and 6C, the collection grooves 336 can include a plurality of flow passages 338 that extend from a third end 340 to a fourth end 341. In some examples, each of the flow passages 338 of the collection grooves 336 can include a main flow passage 342 and a plurality of branched flow passages 343 that branches from the main flow passage 342 and terminates at an outer end 344. FIG. 6A shows an exploded top plan view of a section of the collection grooves 336. FIG. 6B shows a cross-sectional side view of one of the branched flow passages 343 taken along B-B. FIG. 6C shows a cross-sectional side view of the main flow passage 342 taken generally along C-C.

Referring to FIG. 6B, in some examples, each of the branched flow passages 343 when viewed in a side view has a depth D that may progressively decreases as the branched flow passage 343 projects toward the outer end 344 until the branched flow passage 343 is terminated at the outer end 344.

Referring to FIG. 4, the distribution grooves 345 can include a plurality of flow passages 346 that extend from a fifth end 349 to a sixth end 355. The flow passages 346 of the distribution grooves 345 can be similar to the flow passages 338 of the collection grooves 336. In some examples, each of the flow passages 346 of the distribution grooves 345 can include a main flow passage 348 and a plurality of branched flow passages 352 that are similar to those of the collection grooves 336 as illustrated in FIGS. 6A, 6B and 6C. In some instances, each of the main flow passages 342 of the collection grooves 336 are directly connected with a corresponding main flow passage 348 of the distribution grooves 345 at the fourth and fifth ends 341, 349 as shown in FIG. 4 so that the main flow passages 342, 348 are continuous. In some implementations, the groove pattern of the collection grooves 336 is a mirror image of the groove pattern of the distribution grooves 345 along a central axis 1-1 as shown in FIG. 4.

In some examples, the branched flow passages 343 or 352, depending on the relative rotation of the seal ring 300, are configured so that when the lubricant is collected at the outer ends and held near the seal interface, a local pressure gradient is developed at each of the outer ends, and a plurality of the developed local pressure gradients can act cooperatively to counteract a large static pressure load on at least one of the seals.

In some examples, the branched flow passages 343 and/or 352 are oriented away from the direction of rotation of the seal ring 300. In this instance, the depth of the branched flow passages 343 and/or 352 decrease towards the direction of rotation. In some examples, when the branched flow passage 343 and/or 352 is oriented away from the direction of rotation, lubricant can accumulate and form a hydrodynamic pressure gradient. In some examples, the pressure gradient can act against the normal closing force of the seal 300 causing the seal surfaces to separate. In some instances, when the seal surfaces separate, the lubricant can be applied between the seal surfaces. In some examples, separation of the seal surfaces can lead to lower friction.

In some examples, the branched flow passages 343 and/or 352 can be oriented toward the direction of the rotation of the seal ring 300. In this instance, the depth of the branched flow passages 343 and/or 352 increases toward the direction of rotation. In some examples, when the branched flow passages 343 and/or 352 are oriented toward the direction 405 of rotation, the branched flow passages 343 and/or 352 can act to collect lubricant from the seal interface surface and direct lubricant to the main collection grooves 336.

Note that in the above examples, the depth of the branched flow passages 343 is illustrated generally as being sloped. However, it is to be realized that the branched flow passages 343 can be configured in a different manner depending on the specific design requirements of the seal ring 300. For example, the branched flow passages 343 can have a constant depth and/or have edges on the groove that may be curved, chamfered and/or have a sharp step.

Further details of the local pressure gradient will be described with reference to FIGS. 6D and 6E.

Figure 6D:
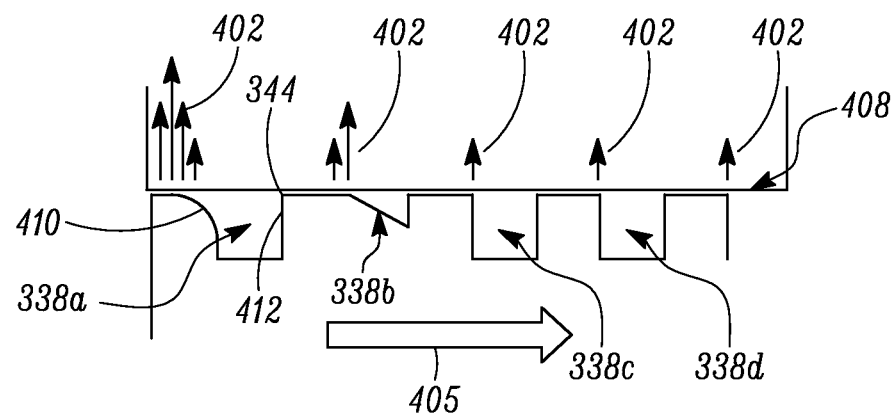
FIG. 6D illustrates a cross-sectional side view of the flow passages of discharge and feed grooves, according to one embodiment.

With reference to FIG. 6D, FIG. 6D illustrates a cross-sectional side view of the flow passages 338 showing flow passages 338a, 338b, 338c and 338d. The arrows 402 represent pressure gradients produced by the hydrodynamic force of the lubricant and a seal interface surface 408 of the seal ring 300. The arrow 405 shows the direction of rotation of the seal ring 300.

In some instances, the shape of the flow passages 338 can be modified. In some examples, the shape of one or both of the upper edges of the flow passages 338 can be modified. For instance, as shown by flow passage 338a in FIG. 6D, an upper edge 410 of the flow passage 338a can be substantially curved, while an opposing upper edge 412 of the flow passage 338a can be straight, thereby making the upper edges 410, 412 of the flow passage 338a asymmetric. In some examples, providing a substantially curved upper edge, e.g., the upper edge 410, can lead to maximizing the pressure gradients produced by the hydrodynamic force. In this example, the length of each of the arrows 402 represents the relative magnitude and size of the hydrodynamic pressure field caused by the lubricant and the seal interface.

In some other examples, the shape of the flow passages 338 can be modified. For instance, the shape of the flow passages 338 can be tapered as shown by flow passage 338b in FIG. 6D. In some examples, providing flow passages that are tapered can lead to a relative increase in the pressure gradients produced by the hydrodynamic force.

In the instance where the upper edges of the flow passages 338 are straight as shown by flow passages 338c and 338d in FIG. 3D, the pressure gradients produced by the hydrodynamic force can be minimized and can be used, for example, to scrape ad redirect the lubricant from the surface.

Note that the shape of flow passages of any of the groove sets 320 can be modified to achieve, for example, effects that are similar to those described above.

Figure 6E:
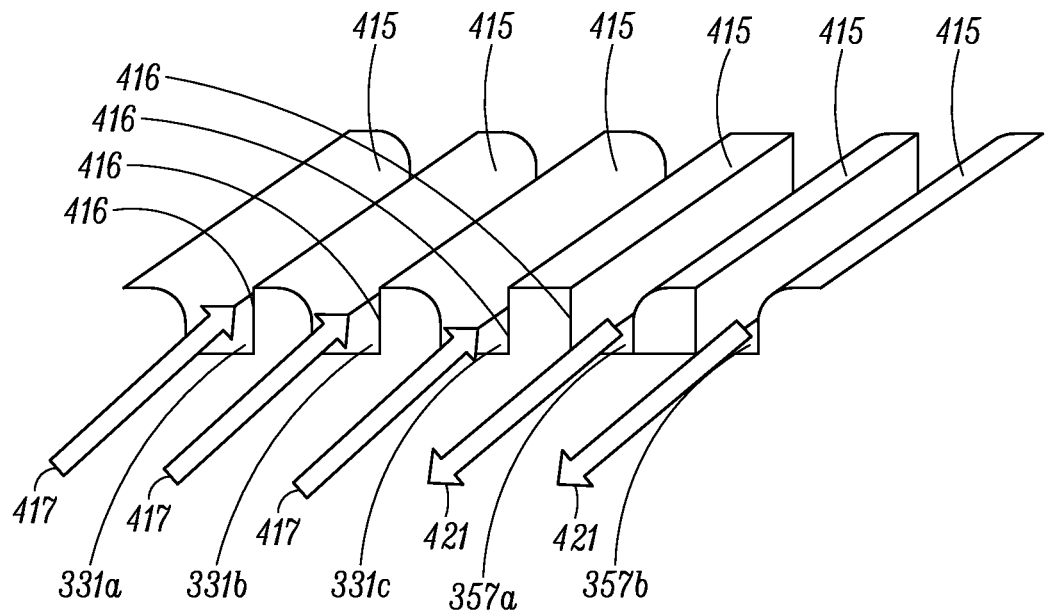
FIG. 6E illustrates a perspective view of the flow passages of the discharge and feed grooves, according to one embodiment.

By way of example, FIG. 6E illustrates a perspective view showing flow passages of feed grooves 357a, 357b and discharge grooves 331a, 331b, 331c. Each of the flow passages 338d, 338e and 338f have one of the upper edges 415 that is rounded, while the other of the upper edges 416 is straight so that the upper edges 415, 416 of the flow passages 338d, 338e, 338f, 338g and 338h are asymmetric. Arrows 417, 421 indicate the direction of flow of the lubricant.

In some examples, when relative motion exists between the two seal surfaces, the feed grooves 331 and discharge grooves 357 are able to establish hydrodynamic pressure fields which are a function of the shape of the flow passages of the grooves 331, 357. In some instances, higher pressure and higher surface area of the field can cause the seal surfaces to separate and the lubricant can be fed between the seal surfaces. In some instances, changes in the shape of the flow passages can be used to scrape lubricant off the surface and return it to the source. When the upper edges of the flow passages of the grooves 331, 357 are, for example, asymmetric as shown in FIG. 6E, the feed grooves 331 can distribute lubricant to the surface of the seal interface. When the lubricant is applied to the interface, fresh lubricant can be drawn into the feed grooves 331 to replenish the lubricant that was applied to the interface. In some examples, the sharp edge on each of the collection grooves 336 can serve to shear lubricant from the seal interface. In some examples, as lubricant is collected in the groove sets 320, the pressure within the groove sets 320 increases beyond the pressure at the lubrication source and therefore lubricant is returned to the source.

In FIG. 4, the collection groves 336 and the distribution grooves 345 are shown to form an arc as viewed in top plan view, where the arc has an inner side 407 and an outer side 409. The inner side 407 of the arc faces the external side 302 of the mechanical face seal 300 so as to direct the lubricant away from the internal side 304 of the seal ring 300. However, it is to be realized that the collection groves 336 and the distribution grooves 345 can have any shape or pattern that is suitable for directing the lubricant away from the internal side 304 of the seal ring 300.

In one implementation, the collection grooves 336 and/or the distribution grooves 345 can be configured so that the lubricant is distributed to where the lubricant is needed, for example, the interface between the stationary seal and the rotating seal ring.

Referring to FIGS. 4, 7A and 7B, the collector 347 can extend from a seventh end 361 to an eighth end 363 and can be generally configured to capture the fresh lubricant from the second end 335 of the feed grooves 331. In some examples, the collector 347 also can be configured to direct the fresh lubricant toward the third end 340 of the collection grooves 336. FIG. 7B shows a cross sectional view of the collector 347 viewed in side view taken along D-D. FIGS. 4 and 7A show the collector 347 as forming an arc viewed in top plan view, where the arc has an inner side 415 and an outer side 417. The inner side 415 faces the external side 302 of the mechanical face seal 300. FIG. 7B shows the collector having a cup shape viewed in side view. However, the collector 347 can have any shape or dimension that is suitable for capturing the lubricant from the second end 335 of the feed grooves 331 so as to prevent the lubricant from entering the internal side 304 of the seal ring 300 and/or direct the fresh lubricant toward the third end 340 of the collection grooves 336.

Referring to FIGS. 4, 5A and 5B, the discharge grooves 357 can include a plurality of flow passages 357a, 357b, 357c, 357d, 357e, 357f and 357g that extend from a ninth end 402 to a tenth end 404 and can be generally configured to discharge warm lubricant out of the seal ring 300 through the ninth end 402. In some examples, the flow passages 357a, 357b, 357c, 357d, 357e, 357f and 357g are configured to collect warm lubricant from the distributing grooves 345. In some other examples, the flow passages 357a, 357b, 357c, 357d, 357e, 357f and 357g can be configured to scrape lubricant off the seal interface when the seal rings are in relative motion to one another. The right hand side of FIG. 5A shows a top plan view of the discharge grooves 357. The right hand side of FIG. 5B shows a cross-sectional side view of the discharge grooves 357 taken along A-A. In FIG. 5A, seven flow passages for the discharge grooves 357 are shown. However, the number of flow passages can be any number that is suitable for allowing the lubricant to flow out of the seal ring 300. Also, in FIG. 5B, each of the flow passages 357a, 357b, 357c, 357d, 357e, 357f and 357g is shown to be cup shaped. However, it is to be realized that the shape of each the flow passages 357a, 357b, 357c, 357d, 357e, 357f and 357g can be any shape that is suitable for allowing the lubricant to flow out of the seal ring 300 through the ninth end 402. In some instances, the discharge grooves 357 can be adjacent to the feed grooves 331 as shown in FIG. 4. In some other instances, the groove pattern of the discharge grooves 357 can be a mirror image of that of the feed grooves 331 along the axis 2-2 as shown in FIG. 5A. In other instances, the feed grooves 331 and the discharge groove 357 may be located in different regions of the seal ring 300 as the particular design may dictate.

Referring to FIGS. 4, 7A and 7C, the retention cavities 351 can include pockets 366 on the seventh end 361 and the eighth end 363 of the collector 347 and can be generally configured to redirect lubricant back toward the discharge grooves 357 so as to prevent leakage. In some instances, the retention cavities 351 can be configured to accumulate mechanical debris. FIG. 7C shows a cross sectional view of one of the retention cavities 351 viewed in side view taken along E-E. FIGS. 4 and 7A show the retention cavities 351 as being substantially circular viewed in top plan view and FIG. 7C shows the retention cavities 351 as being a cup shape viewed in side view. However, the retention cavities 351 can have any shape or dimension that is suitable for capturing the lubricant from the second end 335 of the feed grooves 331 so as to redirect lubricant back toward the discharge grooves 357 thereby preventing leakage and/or accumulate mechanical debris.

One embodiment of a method of reducing friction between two components that rotate relative to one another using the mechanical face seal will now be described. The method can include providing a mechanical face seal described herein. The method can further include providing fresh lubricant to the mechanical face seal, and cooling warm lubricant that has been discharged from the mechanical face seal.

In some embodiments, a system is provided on one or both seal surfaces that can accommodate and retain debris without subjecting force to the debris to mar the seal surfaces. In some instances, the system is the groove sets 320, and the groove sets can accommodate and retain debris without subjecting force to the debris to mar the seal surfaces by allowing lubricant to flow in and out of the seal ring 300 as discussed above.

Advantageously, the use of the mechanical face seal can lead to reduction in friction and heat being carried away from the seal interface. Moreover, the mechanical face seal described herein can redirect lubricant from its normal flow tendency and thereby reduce lubricant leakage from the mechanical face seal.

ASPECTS

Any of aspects 1-22 can be combined with one another.

Aspect 1. A mechanical seal for providing a seal between two components that are rotatable relative to one another, comprising:
a plurality of groove sets that is configured to receive a lubricant from an inside of the seal, direct the lubricant through the groove sets so as to counteract a pressure loading on the seal, and/or discharge the lubricant back to the inside of the seal.

Aspect 2. The mechanical seal of aspect 1, wherein the inside of the seal is a side at which a lubricant source is provided.

Aspect 3. The mechanical seal of any of aspects 1-2, wherein the plurality of groove sets is etched into the seal, wherein the groove sets include feed grooves, collection grooves, distribution grooves, a collector, retention cavities and discharge grooves,
wherein the feed grooves include a plurality of flow passages that extend from a first end to a second end, the feed grooves being configured so that fresh lubricant can be introduced from the inside of the seal through the first end of the feed grooves and directed toward the second end of the feed grooves,
wherein the collection grooves include a plurality of flow passages that extend from a third end to a fourth end, the collection grooves being configured so that the lubricant from the second end of the feed grooves can be collected at the third end of the collection grooves and directed toward the fourth end of the collection grooves,
wherein the distribution grooves include a plurality of flow passages that extend from a fifth end to a sixth end, the distribution grooves being configured so that the lubricant from the fourth end of the collection grooves can be collected at the fifth end of the distribution grooves and directed toward the sixth end of the distribution grooves, wherein each of the flow passages of the distribution grooves includes a plurality of branched flow passages that branches from the one of the flow passages and terminates at an outer end, each of the branched passages when viewed in side view has a depth which progressively decreases as the branched flow passage projects toward the outer end until the branched flow passage is terminated,
wherein the collector extends from a seventh end to an eight end and is configured to capture the fresh lubricant from the second end of the feed grooves and direct the fresh lubricant toward the third end of the collection grooves,
wherein the retention cavities include pockets that are configured to direct the fresh lubricant that has been warmed by friction between the two components resulting from the rotation of the components toward the second end of the feed grooves, and
wherein the discharge grooves include a plurality of flow passages that extend from a ninth end to a tenth end, the discharge grooves being configured to collect the warmed lubricant and discharge the warm lubricant out through the ninth end toward the inside of the seal ring.

Aspect 4. The mechanical seal of aspect 3, wherein the lubricant is fed into the seal in a direction that is substantially perpendicular to a direction of the flow of the lubricant through the feed grooves.

Aspect 5. The mechanical seal of any of aspects 3-4, wherein the groove sets are configured so that lubricant is deposited on a surface of the seal using the feed grooves and/or the discharge grooves, and wherein the collection grooves are configured to capture the lubricant and direct the flow of the lubricant toward the distribution grooves.

Aspect 6. The mechanical face seal of any of aspects 3-5, wherein each of the flow passages of the collection grooves includes one or more of a branched flow passage that branches from the one of the flow passages and terminates at an outer end, each of the branched passages when viewed in side view has a depth that progressively decreases as the branched flow passage projects toward the outer end until the branched flow passage is terminated.

Aspect 7. The mechanical face seal of any of aspects 3-6, wherein the feed grooves and the discharge grooves are adjacent to one another.

Aspect 8. The mechanical face seal of any of aspects 3-7, wherein the feed grooves and the discharge grooves are separate from one another.

Aspect 9. The mechanical face seal of any of aspects 3-8, wherein a groove pattern of the feed grooves is a mirror image of a groove pattern of the discharge grooves along a central axis.

Aspect 10. The mechanical face seal of any of aspects 3-9, wherein a groove pattern of the feed grooves is different from a groove pattern of the discharge grooves.

Aspect 11. The mechanical seal of any of aspects 3-10, wherein the feed grooves and/or the discharge grooves has curved and/or chamfered edges on a leading or trailing edge of the groove.

Aspect 12. The mechanical face seal of any of aspects 3-11, wherein the collection grooves and the distribution grooves are connected so that the collection grooves and the distribution grooves form a continuous flow passage.

Aspect 13. The mechanical face seal of any of aspects 3-12, wherein a groove pattern of the collection grooves is a mirror image of a groove pattern of the distribution grooves along a central axis.

Aspect 14. The mechanical face seal of any of aspects 3-13, wherein the collection grooves and the distribution grooves form an arc as viewed in top plan view so that an inner side of the arc faces the outer side of the mechanical face seal.

Aspect 15. The mechanical face seal of any of aspects 3-14, wherein the branched flow passages are configured so that when lubricant is collected at the outer ends of the branched flow passages and held near a seal interface between the two components during operation, a local pressure gradient is developed at each of the outer ends, and a plurality of the developed local pressure gradients counteracts a static pressure load on at least one of the components.

Aspect 16. The mechanical seal of any of aspects 1-15, wherein an upper edge of a flow passage of the groove sets is shaped so as to promote a hydrodynamic force at a surface of the seal.

Aspect 17. The mechanical seal of any of aspects 1-16, wherein an edge of a flow passage of the groove sets is configured to facilitate removal or scraping of an oil film from an opposing surface of the seal.

Aspect 18. The mechanical face seal of any of aspects 1-17, wherein one of the two components is a stationary seal and the other of the two components is a rotating seal ring.

Aspect 19. The mechanical face seal of any of aspects 1-18, wherein the inside of the seal is a higher pressure side of the seal as compared to that of an outside of the seal.

Aspect 20. The mechanical face seal of any of aspects 3-15, wherein the retention grooves direct the lubricant toward the third end of the collection grooves.

Aspect 21. A method of reducing friction between a rotating seal ring and a stationary seal, comprising:
providing a mechanical seal according to any of aspects 1-20;
introducing fresh lubricant to the first end of the feed grooves;
capturing the fresh lubricant from the feed grooves using the collector;
directing the fresh lubricant to the collection grooves and the distribution grooves;
providing the fresh lubricant to a seal interface between the rotating seal ring and the stationary seal, thereby producing a hydrodynamic force at a surface of the seal, wherein the fresh lubricant is provided to the seal interface by the feed grooves, the distribution grooves, the branched flow passages, and/or the retention cavity;
collecting the lubricant at the seal interface using the collecting grooves and the discharge grooves; and
discharging the fresh lubricant that has been warmed by friction between the rotating seal ring and the stationary seal resulting from the rotation of the rotating seal ring out through the ninth end toward the inside of the seal ring.

Aspect 22. A system, comprising an engineered surface features that are provided on one or both of a stationary seal and a rotating seal, wherein the surface features are configured to accommodate and/or retain debris without subjecting force on the debris to mar a seal surface.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What is claimed is:

1. A mechanical seal for providing a seal between two components that are rotatable relative to one another, comprising:
a plurality of groove sets that is configured to receive a lubricant from a first side of the seal, direct the lubricant through the groove sets so as to counteract a pressure loading on the seal, and/or discharge the lubricant back to the first of the seal,
wherein the plurality of groove sets include:
a plurality of feed grooves extending in a direction from a second side of the seal towards the first side of the seal, each of the feed grooves having a first end at the second side of the seal and a second end towards the first side of the seal,
a plurality of distribution grooves separated from the feed grooves and a plurality of branched flow passages extending from each of the distribution grooves towards the first side of the seal,
a collector configured to capture the lubricant flowing past the second end of the feed grooves and redirect the lubricant toward a retention cavity,
the retention cavity in flow communication with the collector, the retention cavity including a pocket configured to direct the lubricant back toward the second end of the feed grooves.

2. The mechanical seal of claim 1, wherein the first side of the seal is a side at which a lubricant source is provided.

3. A mechanical seal for providing a seal between two components that are rotatable relative to one another, comprising:
a plurality of groove sets that is configured to receive a lubricant from an inside of the seal, direct the lubricant through the groove sets so as to counteract a pressure loading on the seal, and/or discharge the lubricant back to the inside of the seal,
wherein the plurality of groove sets is etched into the seal, wherein the groove sets include feed grooves, collection grooves, distribution grooves, a collector, retention cavities and discharge grooves,
wherein the feed grooves include a plurality of flow passages that extend from a first end to a second end, the feed grooves being configured so that fresh lubricant can be introduced from the inside of the seal through the first end of the feed grooves and directed toward the second end of the feed grooves,
wherein the collection grooves include a plurality of flow passages that extend from a third end to a fourth end, the collection grooves being configured so that the lubricant from the second end of the feed grooves can be collected at the third end of the collection grooves and directed toward the fourth end of the collection grooves,
wherein the distribution grooves include a plurality of flow passages that extend from a fifth end to a sixth end, the distribution grooves being configured so that the lubricant from the fourth end of the collection grooves can be collected at the fifth end of the distribution grooves and directed toward the sixth end of the distribution grooves, wherein each of the flow passages of the distribution grooves includes a plurality of branched flow passages that branches from the one of the flow passages and terminates at an outer end, each of the branched passages when viewed in side view has a depth which progressively decreases as the branched flow passage projects toward the outer end until the branched flow passage is terminated,
wherein the collector extends from a seventh end to an eight end and is configured to capture the fresh lubricant from the second end of the feed grooves and direct the fresh lubricant toward the third end of the collection grooves,
wherein the retention cavities include pockets that are configured to direct the fresh lubricant that has been warmed by friction between the two components resulting from the rotation of the components toward the second end of the feed grooves, and
wherein the discharge grooves include a plurality of flow passages that extend from a ninth end to a tenth end, the discharge grooves being configured to collect the warmed lubricant and discharge the warm lubricant out through the ninth end toward the inside of the seal ring.

4. The mechanical seal of claim 3, wherein the lubricant is fed into the seal in a direction that is substantially perpendicular to a direction of the flow of the lubricant through the feed grooves.

5. The mechanical seal of claim 3, wherein the groove sets are configured so that lubricant is deposited on a surface of the seal using the feed grooves and/or the discharge grooves, and wherein the collection grooves are configured to capture the lubricant and direct the flow of the lubricant toward the distribution grooves.

6. The mechanical face seal of claim 3, wherein each of the flow passages of the collection grooves includes one or more of a branched flow passage that branches from the one of the flow passages and terminates at an outer end, each of the branched passages when viewed in side view has a depth that progressively decreases as the branched flow passage projects toward the outer end until the branched flow passage is terminated.

7. The mechanical face seal of claim 3, wherein the feed grooves and the discharge grooves are adjacent to one another.

8. The mechanical face seal of claim 3, wherein the feed grooves and the discharge grooves are separate from one another.

9. The mechanical face seal of claim 3, wherein a groove pattern of the feed grooves is a mirror image of a groove pattern of the discharge grooves along a central axis.

10. The mechanical face seal of claim 3, wherein a groove pattern of the feed grooves is different from a groove pattern of the discharge grooves.

11. The mechanical seal of claim 3, wherein the feed grooves and/or the discharge grooves has curved and/or chamfered edges on a leading or trailing edge of the groove.

12. The mechanical face seal of claim 3, wherein the collection grooves and the distribution grooves are connected so that the collection grooves and the distribution grooves form a continuous flow passage.

13. The mechanical face seal of claim 3, wherein a groove pattern of the collection grooves is a mirror image of a groove pattern of the distribution grooves along a central axis.

14. The mechanical face seal of claim 3, wherein the collection grooves and the distribution grooves form an arc as viewed in top plan view so that an inner side of the arc faces the outer side of the mechanical face seal.

15. The mechanical face seal of claim 3, wherein the branched flow passages are configured so that when lubricant is collected at the outer ends of the branched flow passages and held near a seal interface between the two components during operation, a local pressure gradient is developed at each of the outer ends, and a plurality of the developed local pressure gradients counteracts a static pressure load on at least one of the components.

16. The mechanical seal of claim 1, wherein an upper edge of a flow passage of the groove sets is shaped so as to promote a hydrodynamic force at a surface of the seal.

17. The mechanical seal of claim 1, wherein an edge of a flow passage of the groove sets is configured to facilitate removal or scraping of an oil film from an opposing surface of the seal.

18. The mechanical face seal of claim 1, wherein one of the two components is a stationary seal and the other of the two components is a rotating seal ring.

19. The mechanical face seal of claim 1, wherein the first side of the seal is a higher pressure side of the seal as compared to that of the second side of the seal.

20. The mechanical face seal of claim 3, wherein the retention grooves direct the lubricant toward the third end of the collection grooves.

21. A method of reducing friction between a rotating seal ring and a stationary seal, comprising:
providing a mechanical seal including a plurality of groove sets that is configured to receive a lubricant from an inside of the seal, direct the lubricant through the groove sets so as to counteract a pressure loading on the seal, and/or discharge the lubricant back to the inside of the seal;
introducing fresh lubricant to a first end of feed grooves of the plurality of groove sets;
capturing the fresh lubricant from the feed grooves using a collector of the plurality of groove sets;
directing the fresh lubricant to collection grooves and distribution grooves of the plurality of groove sets;
providing the fresh lubricant to a seal interface between the rotating seal ring and the stationary seal, thereby producing a hydrodynamic force at a surface of the seal, wherein the fresh lubricant is provided to the seal interface by the feed grooves, the distribution grooves, branched flow passages of the mechanical seal, and/or a retention cavity of the mechanical seal;
collecting the fresh lubricant at the seal interface using the collecting grooves and the discharge grooves; and
discharging the fresh lubricant that has been warmed by friction between the rotating seal ring and the stationary seal resulting from the rotation of the rotating seal ring out through an end toward the inside of the seal ring.

22. A system, comprising an engineered surface features that are provided on one or both of a stationary seal and a rotating seal, wherein the surface features are configured to accommodate and/or retain debris without subjecting force on the debris to mar a seal surface.

* * * * *